United States Patent Office 3,333,940
Patented Aug. 1, 1967

3,333,940
PROCESS COMPRISING IMPREGNATION OF EX-
FOLIATED VERMICULITE WITH UREA-FORM-
ALDEHYDE, AND PRODUCT THEREOF
John L. Ridgeway, Indianapolis, Ind., assignor to W. R.
Grace & Co., New York, N.Y., a corporation of Con-
necticut
No Drawing. Continuation of abandoned application Ser.
No. 412,222, Nov. 18, 1964. This application May 13,
1966, Ser. No. 551,841
9 Claims. (Cl. 71—29)

This application is a continuation of Ser. No. 412,222 filed Nov. 18, 1964, now abandoned, which was a continuation-in-part of Ser. No. 19,451 filed Apr. 4, 1960, now abandoned.

The present invention relates to novel plant nutrient compositions, and is particularly concerned with high analysis, lightweight fertilizers, and to methods of preparing them.

The addition of various chemicals to the soil for the purpose of supplying elements needed for healthy plant growth is of course an old practice. In commercial fertilizers, particularly those known as chemical fertilizers, several different chemical compounds are usually mixed together to supply nitrogen, phosphorus and potassium in the required proportions, although in some specialty fertilizers, one or even two of these components may be omitted.

Many of the chemical compounds useful in plant nutrition are quite soluble in water, and are capable of injuring the plant if used in too high a concentration. Accordingly, it has been necessary when using nutrient compositions containing such compounds to apply the compositions frequently and in relatively small quantities in order, on the one hand, to nourish the plant properly and, on the other hand, to prevent burning of the plant by the presence of high concentrations of the nutrient chemicals. However, the quantities of such readily soluble chemicals necessary for proper plant nutrition are usually too small to be spread uniformly with ordinary fertilizer spreaders, so that the application of such chemical nutrients by the ordinary gardener presented some difficulties. A further disadvantage of such chemical nutrients is that an appreciable proportion thereof is commonly lost by being leached from the soil.

Attempts have been made to remedy some of these difficulties by using chemical compounds, including organic nitrogen compounds, which are substantially insoluble, but which weather slowly or are slowly broken down by bacterial action, whereby a slow release of the needed nutritional elements is effected. However, chemical nutrients are seldom used alone but, rather, in admixture with other nutrient chemicals, and such mixtures have not proved entirely satisfactory owing to the segregation of the several components which occurs during transportation and storage of such mixtures, thereby destroying the uniformity which is necessary to their effective use.

In the above-mentioned application, Ser. No. 469,298, the invention described is concerned with the preparation of dry-appearing, free-flowing, granular compositions, such as plant nutrient compositions, in which a liquid or a solid agent is carried on and within a foraminous mineral core or carrier. In the latter instance, the solid agent is either completely or partially dissolved when it is applied to the inorganic carrier, so that as the solvent evaporates the dissolved agent is deposited on the foraminous core, and within its pores, and is thus cemented thereon.

The present invention likewise relates to dry, free-flowing, granular plant nutrition compositions comprising a solid agent cemented to an insoluble inorganic foraminous carrier or core, but differs from the invention of the said application, Ser. No. 469,298, in that in the present instance the solid agent is a product of reaction between urea and formaldehyde and is preferably formed in situ on the foraminous carrier. In its preferred form, the present invention comprises a core or base of exfoliated vermiculite covered with, and preferably impregnated with, an adherent mass of a urea-formaldehyde condensation polymerization product. Preferably, this condensation polymerization product serves as a bonding agent whereby other plant nutrients such as comminuted nitrogen-, phosphorous-, and/or potassium-containing materials are cemented to the core, and, if desired, the said urea-formaldehyde condensation polymerization product may completely encase such other plant nutrients to limit their solution rate.

It is an object of the invention to provide a lightweight, free-flowing plant nutrient composition having a slowly soluble nitrogen source which, in use, provides nitrogen over an extended period without appreciable loss thereof by leaching.

A further object of the invention is to provide a plant nutrient composition having an insoluble, lightweight mineral core or base of exfoliated vermiculite impregnated with a reaction product of urea and formaldehyde formed in situ.

A further object is to provide a plant nutrient composition having an insoluble mineral core or base of exfoliated vermiculite and a granular or finely divided chemical or group of chemical nutrients distributed in the core, and bonded thereto by a urea-formaldehyde reaction product. The urea-formaldehyde reaction product may also cover the individual nutrient particles in the finished nutrient composition. Thus, if the individual nutrient chemicals are very soluble in water, and would therefore be in danger of being lost in appreciable amounts through leaching, the substantially insoluble, or slowly soluble, urea-formaldehyde reaction product may serve the additional function of delaying solution of such nutrients and thereby prolonging the period of time in which the component compounds are effective as nutrients.

Other objects and advantages of the invention will be obvious from the following description thereof.

Briefly speaking, the products of the invention may be made by bringing an aqueous mixture of urea and formaldehyde into contact with the desired foraminous carrier, such as exfoliated vermiculite, under conditions suitable for the urea-formaldehyde reaction. A suitable aqueous solution of urea-formaldehyde which will polymerize in situ is sold under the trademark Urac. The initial product resulting from the condensation reaction between urea and formaldehyde is methylene urea, which, in itself, is a useful nitrogen source and has the desirable property of being slowly soluble in water. I prefer, however, to permit such condensation products to polymerize, the polymerization being promoted by elevated temperatures and acid pH conditions under which the reaction takes place, and the length of the polymer chain being a function of the length of time these reaction conditions are maintained. Lowering the temperature and raising the pH to neutral or slightly alkaline reaction slows or stops the polymerization. The mole ratio of urea to formaldehyde also effects the extent and type of polymer formation. Low urea and high formaldehyde mole ratios give a product which is hard and relatively insoluble in water. Higher urea and low formaldehyde mole ratios give a softer, more soluble product, so that a urea:formaldehyde ratio between 1.5:1 and 2.2:1 is more desirable for agronomic use than a ratio, say, of 0.5:1 or 1:1. Preferably, other nutrient components in the comminuted condition are present when the urea-formaldehyde mixture is added to the granular core material, whereby such added nutrient compounds are cemented to the core material by means of the condensation-polymer formed in situ on the core.

The unique structure of exfoliated vermiculite co-operates with the urea-formaldehyde resin impregnant and other plant nutrients to provide a superior long-life fertilizer. Each exfoliated vermiculite particle comprises a large number of spaced-apart, attached platelets. This porous structure has utility as a soil conditioner, being chemically inert and providing prolonged porosity to soil with which it is mixed. The urea and formaldehyde solutions employed in the process of this invention penetrate between the platelets due to the relatively low viscosity of the solutions and form integral bonds with the inner surface of the vermiculite when reacted in situ. The platelets limit the surface area of the urea-formaldehyde and other nutrients exposed to the action of water and bacteria in the soil, thereby prolonging the usefulness of the fertilizer as a nutrient source. The process and composition of this invention is not to be confused with the coating of vermiculite with preformed urea-formaldehyde polymers. The high viscosity of the preformed polymers prevents intimate penetration of the porous exfoliated vermiculite structure by the polymer. In contrast, the polymer is formed in situ after impregnation of the porous exfoliated vermiculite structure in the process of this invention.

The following examples are illustrative of my invention, and it will be understood by those skilled in the art that various modifications may be made therein without departing from the spirit and scope of the invention.

*Example I*

| | Lbs. |
|---|---|
| #4 exfoliated vermiculite | 281 |
| Triple superphosphate (45% $P_2O_5$) | 445 |
| Muriate of potash (60% $K_2O$) | 167 |
| Urea (46% N) | 174 |
| 66° Bé. sulfuric acid | 93 |
| Ammoniating solution (24.5% free ammonia, 56.0% ammonium nitrate, 10% urea, 9.5% water) [1] | 270 |
| Urea (46% N) | 400 |
| Aqueous urea-formaldehyde (60% formaldehyde, 25% urea, 12% water, by weight) [2] | 200 |

[1] "Urana 10," a commercial ammoniating solution marketed by Nitrogen Division, Allied Chemical Corporation.
[2] "N-Dure," a product manufactured by the Nitrogen Division, Allied Chemical Corporation. This product weighs about 11.1 lbs./gallon and has a viscosity of 1250 centipoises at 0° C. and 40 centipoises at 55° C.

The vermiculite, triple superphosphate, muriate of potash, and 174 lbs. of urea are mixed dry in a tumble mixer. The sulfuric acid is then added, followed by the ammoniating solution. The free ammonia in the ammoniating solution reacts with the phosphoric acid in the triple superphosphate to the extent of about 35 lbs. of ammonia, and the remaining 31 lbs. of ammonia combine with the sulfuric acid. Following this reaction, a premixture of the 400 lbs. of urea and 200 lbs. of aqueous urea-formaldehyde, which mixture has been heated to about 190° to 195° F. to dissolve the urea and start the reaction with the formaldehyde, is sprayed into the batch during mixing. The urea-formaldehyde premixture solidifies upon cooling, thereby cementing the undissolved urea potash and phosphate materials to the vermiculite particles. The particles of the undissolved urea, phosphate and potash materials are at the same time enveloped in a film of slowly soluble urea-formaldehyde resin which is effective to reduce the leaching rate of said coated particles. The consolidation on the vermiculite of the other solids of the mixture is enhanced by the absorption of water by the vermiculite, resulting in a deposit of solids on the vermiculite in much the same way as the buildup of filter-cake in a filter press. The product can be dried in any suitable dryer, such as a rotary dryer or belt dryer, to reduce its moisture content below 5%, if desired, although this is not absolutely necessary. The belt dryer is especially preferred for this purpose since its use leads to a product substantially free of dust. It is desirable to keep the temperature of the material below about 75° C. during such drying operation to preclude excessive additional polymerization of the urea-formaldehyde.

The foregoing example illustrates the preparation of a 20-10-5 analysis fertilizer (i.e., a composition containing 20% N, 10% $P_2O_5$, and 5% $K_2O$) in which 10 units of nitrogen are derived from the premixture of "N-Dure" and urea, four units of nitrogen are derived from solid urea, and six units of nitrogen from the ammoniating solution; the ten units of $P_2O_5$ are derived from triple superphosphate, and five units of $K_2O$ from the muriate of potash.

*Example II*

| | Lbs. |
|---|---|
| Urea (45% N) | 400 |
| Water | 70 |
| #1 exfoliated vermiculite | 625 |
| Muriate of potash (60% $K_2O$) | 167 |
| Urea (45% N) | 280 |
| Phosphoric acid 75% (54.5% $P_2O_5$) | 366 |
| Anhydrous ammonia (82% N) | 92 |
| Aqueous urea-formaldehyde solution—11.5% N (60% formaldehyde, 25% urea, 15% water) | 200 |

The 400 lbs. of urea is first dissolved in the 70 lbs. of water by heating the mixture to 95° to 105° C. with agitation. The vermiculite, muriate of potash, and 280 lbs. of urea are mixed dry in a tumble mixer. While the mixing is continued, the phosphoric acid is sprayed into the dry mixture, after which the 92 lbs. of anhydrous ammonia is added. If desired an equivalent quantity of aqueous ammonia may be used in place of the anhydrous ammonia. The heat of the neutralization reaction brings the temperature of the batch up to about 55° to 70° C. The aqueous urea-formaldehyde solution is then mixed rapidly with the hot urea solution, and the resulting mixture sprayed immediately into the tumble mixer onto the solid materials. A thorough mixing of the resulting mass in the tumble mixer produces discreet granules coated with a slowly soluble condensation polymer of urea and formaldehyde which is formed under the reaction conditions. The product is then dried in a rotary or belt dryer, keeping the product temperature below the 75° C.

In Example II the pH of the mixture of the vermiculite, potash, urea, and phosphoric acid after ammoniating is 5.3. The temperature of the batch is 55° to 75° C., depending on the ambient temperature. The temperature of the permixture of urea and the urea-formaldehyde solution at the time of spraying is 80° to 85° C. The temperature of the batch dropped to about 50° C. shortly after spraying, and the pH of the finished materials was 5.8.

It is advantageous to dissolve separately the solid urea which is intended to be reacted and formaldehyde before adding it to the aqueous urea-formaldehyde solution since this technique permits exact control of the proportions of urea and formaldehyde available for reaction throughout the condensation-polymerization. In addition, this technique permits the easy control of the reaction time between correct proportions of the urea and formaldehyde before spraying the mixture onto the solid batch. Also, unwanted premature polymerization, which may occur prior to introduction of the urea-formaldehyde mixture into the mixer, is avoided by this technique since the urea solution can be maintained separately at elevated temperatures for an indefinite period.

Example III

| | Lbs. |
|---|---|
| Aqueous urea-formaldehyde solution (60% formaldehyde, 25% urea, 15% water, by weight) | 540 |
| Urea | 1180 |
| Exfoliated vermiculites | 500 |
| Sulphuric acid (66° Bé.) | 30 |
| Anhydrous ammonia | 10 |

The 1180 lbs. of urea is first dissolved in about 210 lbs. of hot water and the resulting solution then mixed with the aqueous urea-formaldehyde solution. Immediately thereafter the resulting mixture is applied to the exfoliated vermiculite, preferably by spraying, while the vermiculite is being mixed in a rotating mixer. The sulphuric acid is then introduced into the mixer, thereby promoting polymerization of the urea-formaldehyde product. The polymerization reaction takes place quickly and therefore the introduction of the ammonia is made simultaneously with the acid addition or immediately thereafter, to neutralize the acid. The product is then dried in a rotary dryer or belt dryer to reduce the moisture content from about 13% to about 4% or lower.

It is advantageous to apply the urea-formaldehyde mixture to hot vermiculite so that the heat required for final drying may be reduced. Accordingly, in a modification of the invention, the urea-formaldehyde mixture is sprayed onto hot exfoliated vermiculite as it is discharged from the vermiculite furnace at a temperature of about 900° to about 1400° F. Since the discharge of the exfoliated vermiculite from the furnace occurs at a constant rate per unit of time, this modification of the invention is adapted to a continuous operation for preparing the improved product of the present invention. A spray nozzle delivers the urea-formaldehyde solution at a constant rate onto the hot vermiculite as it descends the discharge chute, the temperature of the resulting mass dropping to around 200° F. at this stage because of the heat lost in flashing off the steam. The resulting material is then passed on through a tube mixer where sulphuric acid is sprayed on continuously and anhydrous ammonia is introduced, preferably under the moving bed of the material.

In another modification of the present process the aqueous urea-formaldehyde solution may be mixed with fertilizers containing urea, and the resulting mixture left in a large pile for curing. In such modification the formation of the desired urea-formaldehyde condensation polymer may take several weeks.

Although the foregoing examples have been confined to the production of plant nutrient containing conventional chemical fertilizers, it will be understood that other chemical compounds, including trace elements necessary for healthy plant growth may be incorporated in my improved products, although such compounds may not themselves be considered fertilizers in the usual sense. An an example of such chemical compounds, mention may be made of the iron chelate disodium mono-iron salt of ethylenediamine tetraacetic acid, which is useful in correcting "iron chlorosis" in citrus fruit trees, and which is discussed in the said application, Ser. No.469,298. This material may be applied to a core of exfoliated vermiculite or other porous base material in the manner described in application Ser. No. 469,298, and the urea-formaldehyde solution then sprayed or otherwise applied to the resulting product with mixing. In such operation the pH of the chelate-coated core, and its temperature, will of course be adjusted in the manner indicated above to assure proper condensation-polymerization of the urea-formaldehyde material. In the final product the urea-formaldehyde resin assists in binding the chelate to the core material and, in addition, may envelop the chelate particles to reduce their leaching rate.

It will be also understood that if desired other acids such as nitric or hydrochloric acid, may be used instead of the sulfuric acid, and only porous materials may be substituted for the preferred exfoliated vermiculite in my novel compositions. It will also be clear that various modifications and substitutions in the ingredients and their proportions may be resorted to in order to produce a final product of the desired analysis and density. For instance, in Example I the product, which contains 281 lbs. of vermiculite per ton, has a bulk density of about 35 to 40 lbs. per cubic foot, while the bulk density of the product of Example II, which contains 625 lbs. of vermiculite per ton, is between about 20 to 24 lbs. per cubic foot. Replacing part of the phosphoric acid in Example II with triple superphosphate will result in an increase in bulk density. Also, part of the urea in the above examples may be replaced by sulfuric acid and an equivalent amount of ammoniating solution, and this will likewise tend to increase the bulk density. The particle size of the vermiculite used in preparing the present composition is of course an important factor in controlling the bulk density, small particle sizes of vermiculite yielding a denser product than an equal weight of coarse particle size vermiculite. The other solid ingredients, which are bound to the vermiculite core by the urea-formaldehyde reaction product, preferably have a smaller particle size than that of the vermiculite.

It will be seen, therefore, that by means of the present invention I have provided novel compositions characterized by an adherent deposit on a substantially insoluble porous core material, of a slowly soluble urea-formaldehyde reaction product, whereby a plant nurtient composition of desirably slow solubility and conveniently low bulk density is provided, permitting easy handling by the ordinary gardener and accurate distribution over the soil area to be treated by means of conventional fertilizer spreaders. Where additional dry chemicals essential for nutriation or for combatting diseases of the plants are incorporated in the compositions, the urea-formaldehyde condensation-polymerization product may not act only as the adhesive for cementing such particles to the foraminous core, but may also completely envelop such chemical particles where their solubility is such that losses by leaching may occur if they are exposed to the rains and weather.

I claim:
1. A fertilizer composition comprising exfoliated vermiculite, the internal surface of the platelets of the vermiculite being impregnated and bonded with a urea-formaldehyde condensation polymer formed in situ, said composition being in granular form.

2. A fertilizer composition according to claim 1 wherein spaces between the platelets contain comminuted fertilizer materials selected from the group consisting of nitrogen-, phosphate-, and potash-containing compounds and the urea-formaldehyde condensation polymer coats the granular particles.

3. A fertilizer composition according to claim 1 wherein the mole ratio of urea:formaldehyde in the condensation polymer is between about 1.5:1 and 2.2:1.

4. A method of preparing a fertilizer composition comprising mixing an aqueous solution of urea and formaldehyde with granulated exfoliated vermiculite whereby intimate penetration of the vermiculite is effected, acidifying the resulting mixture by the addition of an acid thereto to catalyze condensation of said urea and formaldehyde in situ, and then adding ammonia to said mixture to substantially neutralize said acid.

5. A method of making a fertilizer composition comprising mixing exfoliated vermiculite with comminuted fertilizer materials selected from the group consisting of nitrogen-, phosphate-, and potash-containing compounds whereby spaces between the vermiculite platelets contain comminuted fertilizer materials, wetting the vermiculite and fertilizer material mixture with an aqueous solution of urea and formaldehyde having a mole ratio of urea:formaldehyde between about 1.5:1 and 2.2:1 whereby the solution penetrates passages between the vermiculite platelets, and polymerizing the urea and formaldehyde in situ.

6. A method of making a fertilizer composition comprising distributing over granulated exfoliated vermiculite, which is still at superatmospheric temperature following exfoliation thereof by heating, an aqueous solution of urea and formaldehyde, the mole ratio of urea to formaldehyde in said solution being between about 1.5:1 and about 2.2:1, acidifying the resulting mass with sulfuric acid and adding immediately thereafter to said mass, while mixing the latter, an amount of anhydrous ammonia sufficient to substantially neutralize said sulfuric acid.

7. A method of preparing a complete fertilizer composition comprising intimately mixing exfoliated vermiculite, triple superphosphate, a potash-containing compound and urea in dry form, moistening said mixture with sulfuric acid, adding ammonia to said acidified mixture in an amount to react with the phosphoric acid in said triple superphosphate and to substantially neutralize said sulfuric acid, mixing the resulting product with an aqueous solution of urea and formaldehyde, the mole ratio of urea to formaldehyde in said solution being between about 1.5:1 and about 2.2:1, and curing the urea and formaldehyde impregnated mixture to form a urea-formaldehyde resin.

8. The method in accordance with claim 7 wherein said solution of urea and formaldehyde is preheated to about 190° to 195° F. and is then applied to said resulting product by spraying.

9. A method of preparing a fertilizer composition comprising intimately mixing exfoliated vermiculite, a potash-containing compound and urea in dry form, wetting said mixture with phosphoric acid, adding ammonia to said acidified mixture in an amount effective to substantially neutralize said acid, then mixing the resulting mixture with an aqueous solution of urea and formaldehyde in which the ratio of urea to formaldehyde is between about 1.5:1 and about 2.2:1, and curing the urea and formaldehyde impregnated mixture to form a urea-formaldehyde resin.

References Cited
UNITED STATES PATENTS

| | | | |
|---|---|---|---|
| 2,096,742 | 10/1937 | Hale | 71—28 X |
| 2,618,546 | 11/1952 | Davenport | 71—30 |
| 2,698,251 | 12/1954 | Shea et al. | 260—39 X |
| 2,714,553 | 8/1955 | Bibb et al. | 71—64 X |
| 2,931,716 | 4/1960 | Kelley et al. | 71—64 X |
| 3,006,753 | 10/1961 | Harvey | 71—29 |
| 3,076,700 | 2/1963 | Renner | 71—64 X |
| 3,129,091 | 8/1964 | Buter | 71—28 |

DONALL H. SYLVESTER, *Primary Examiner.*

T. D. KILEY, *Examiner.*